Oct. 9, 1923.

F. E. COULTER

FOLDING BINDER REEL

Filed April 7, 1922

1,470,061

Inventor
F. E. COULTER

By Earl M. Sinclair
Atty.

Patented Oct. 9, 1923.

1,470,061

UNITED STATES PATENT OFFICE.

FRED E. COULTER, OF STRATFORD, IOWA.

FOLDING BINDER REEL.

Application filed April 7, 1922. Serial No. 550,500.

*To all whom it may concern:*

Be it known that I, FRED E. COULTER, a citizen of the United States of America, and resident of Stratford, Hamilton County, Iowa, have invented a new and useful Folding Binder Reel, of which the following is a specification.

The object of this invention is to provide an improved reel for use on binders and the like, which reel may be folded to economize space and to minimize the danger of breakage of the reel, particularly in storage of the machine on which it is used.

A further object of this invention is to provide improved means for clamping the reel arms and holding them in the proper position for use.

My invention consists in the construction, arrangement and combination of elements hereinafter set forth, pointed out in my claims and illustrated by the accompanying drawing, in which—

Figure 1:
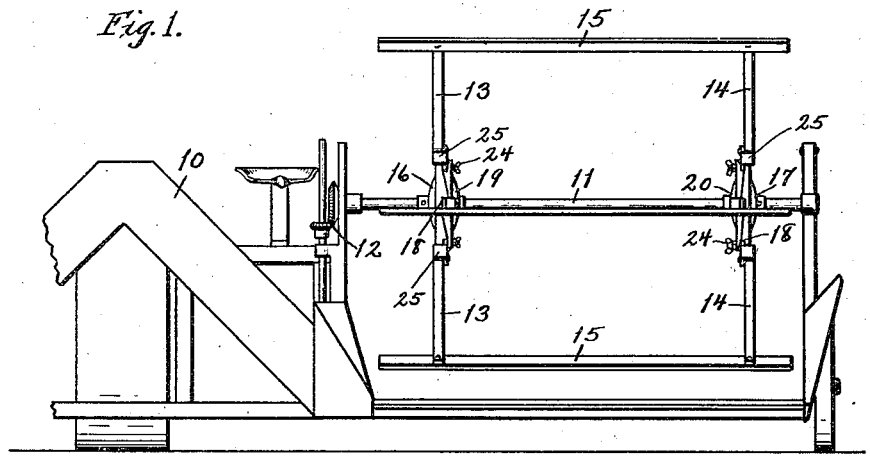
Figure 3:
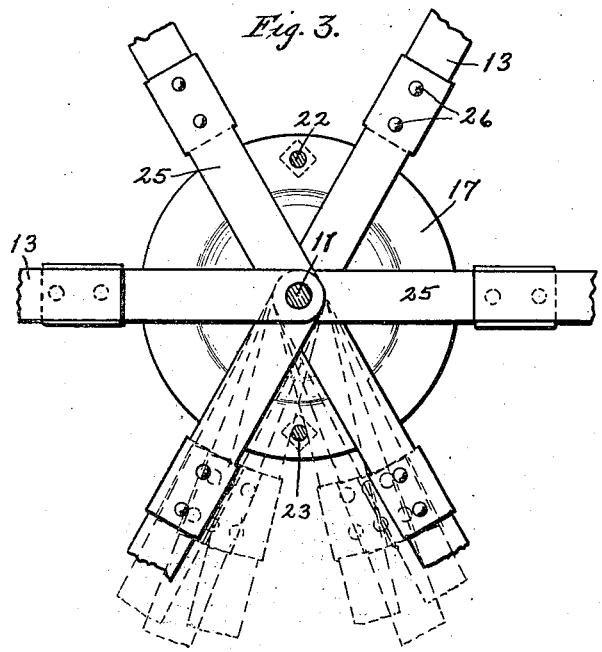
Figure 2:
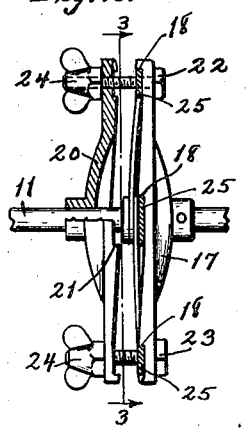

Figure 1 is a front elevation showing a portion of a grain binder on which my improved reel is mounted. Figure 2 is an elevation, partly in section, showing a portion of the reel shaft, clamping members thereon, and reel arms in position to be engaged by said clamping members, on an enlarged scale. Figure 3 is a sectional elevation, on a further enlarged scale, taken substantially on the line 3—3 of Figure 2.

In the accompanying drawing the numeral 10 designates generally a grain binder, of any suitable form and construction, on which is mounted a reel shaft 11 adapted to be driven by gearing 12 from the binder mechanism, and to be rotated in a forward direction, in a common manner, as the binder advances. A reel is formed of two sets of arms, designated 13 and 14, radiating from the shaft 11 normally, and carrying slats 15 connecting the members of said sets in pairs. In the ordinary construction the reel so formed is of rigid construction, the arms 13, 14 being fixed on the shaft; and although means is provided for raising and lowering the reel bodily, yet it projects, at its lowest point of adjustment, a considerable distance above the other portions of the binder. In many instances it is found necessary to remove the reel entirely in order that the machine may enter the storage place provided for it, and often when necessary care and precautions are not taken, damage results to the reel in the effort to place the machine in such storage place. It is my purpose to provide a reel which may be readily folded to such position that the members thereof do not project above the other portions of the machine, thus obviating the difficulties above noted; and also rendering it possible to remove and replace broken parts in small and relatively inexpensive sections.

Two toothed or ratchet disks 16, 17 are provided and are set rigidly on the shaft 11 in properly spaced relation, said disks being cupped in their central portions and oppositely arranged on the shaft. The disks 16, 17 are each formed with a series of equally spaced teeth, stops or shoulders 18 on one face, each of which stops or shoulders is adapted to engage an arm 13, 14 and cause rotation of said arms with the shaft 11. Clamping disks 19, 20 are provided and each is mounted loosely on the shaft 11 adjacent to and facing one of the toothed disks 16, 17, said clamping disks also being cupped in their central portions. The clamping disks 19, 20 preferably are toothed or shouldered on their faces opposed to the rigid disks 16, 17, as at 21, so as to conform to the contour of the rigid disks and permit intimate engagement therewith in order to clamp the arms 13 and 14 tightly between said disks. Clamping bolts 22, 23 are mounted through the disks 16—19 and 17—20 and wing nuts 24 are mounted on said bolts and are adapted to be drawn up tight to clamp the arms 13, 14 between said disks. The wing nuts 24 preferably are formed with means for engagement by a wrench so that they may be drawn up tight. Each arm 13, 14 is secured to the shaft 11 by means of a bar 25 of metal pivotally mounted at one end on said shaft and at its opposite end channeled or flanged to embrace three faces of an arm and secured thereto by rivets or bolts 26.

In practical use the several bars 25 of the arms 13 and 14 are arranged in contact with the respective teeth or shoulders 18 of the toothed disks 16 and 17, whereby the arms of each set are equally spaced apart on the shaft. Then the clamping bolts are tightened to draw the clamping plates 19, 20 up tightly against the bars and against the toothed disks, the clamping disks being turned to such position on the shaft that their teeth or shoulders coincide with the teeth or shoulders of the stationary disks.

By this means the members of the reel are held in their normal position for operation. At any time when it is desired to compact the reel the bolts 22, 23 are loosened to release the clamping disks 19, 20 and the bars 25 turned through arcs on the shaft to depending positions, as shown in dotted lines in Figure 3.

Successive channeled or flanged bars 25 of each set preferably are progressively or successively arranged to face in opposite directions, whereby the arms 13 and 14 are staggered relative to a vertical plane, and are thereby permitted to compact more closely than if all in the same plane.

The cupping of the central portions of the disks 16, 17, 19 and 20 provides space for the overlapping ends of the bars 25.

I claim as my invention—

1. In a binder reel, a shaft, a plurality of arms each pivotally mounted on said shaft and adapted to carry reel slats, a disk secured to said shaft, said disk being formed with a plurality of shoulders each adapted to engage one of said arms, and a clamping plate loosely mounted on the shaft and adapted to be drawn into clamping engagement with the first disk and clamp said arms between them, said disks being cupped in their central portions to provide space for the overlapping ends of said arms, said arms being adapted to be moved manually circumferentially of said shaft upon release of the clamping engagement, for collapsing said reel.

2. In a binder reel, a shaft, a plurality of arms each pivoted at one end on said shaft and movable at times through arcs circumferentially thereof to fold the reel, a disk loosely mounted on said shaft, a disk fixed to the shaft on the opposite side of said arms from said loose disk, said disks being formed on their opposing faces with coacting shoulders adapted to engage the several arms and cause rotation thereof with the shaft, and means for clamping said disks together, said means comprising clamping bolts mounted through said disks and wing nuts threaded on said bolts.

Signed at Stratford, in the county of Hamilton and State of Iowa, this 14th day of February, 1922.

FRED E. COULTER.